United States Patent [19]

Westbrook et al.

[11] Patent Number: 4,796,255
[45] Date of Patent: Jan. 3, 1989

[54] METHOD OF SYNCHRONIZATION BETWEEN DATA COMMUNICATION DEVICES PERMITTING PEER-PEER AND MASTER-SLAVE COMMUNICATIONS

[75] Inventors: James E. Westbrook, Sylmar; Adolfo B. Juarez, Los Angeles, both of Calif.

[73] Assignee: Datos Corporation, Van Nuys, Calif.

[21] Appl. No.: 859,288

[22] Filed: May 2, 1986

[51] Int. Cl.⁴ .......................... H04J 3/06; H04L 7/00
[52] U.S. Cl. .................................. 370/100; 370/107; 370/109
[58] Field of Search ............... 370/100, 103, 108, 104; 375/107, 109; 455/51

[56] References Cited

U.S. PATENT DOCUMENTS

| | | | |
|---|---|---|---|
| 3,801,981 | 4/1974 | Alpers | 375/109 |
| 3,813,496 | 5/1974 | Maillet | 370/104 |
| 4,253,181 | 2/1981 | Watten | 370/103 |
| 4,602,375 | 7/1986 | Inukai | 375/109 |
| 4,688,217 | 8/1987 | Ishi et al. | 370/103 |

Primary Examiner—Douglas W. Olms
Assistant Examiner—Wellington Chin
Attorney, Agent, or Firm—Lyon & Lyon

[57] ABSTRACT

In a telecommunication switching system, a communication link between distant devices is allocated in a quasi-TDMA (time division multiple access) manner between two distant devices. Messages are conformed to a data format which allows the switching center to determine in which direction data is to be transmitted, within at most a few bit transmission times. Both half-duplex and full-duplex communication links are possible.

10 Claims, 3 Drawing Sheets fig. 1.

METHOD OF SYNCHRONIZATION BETWEEN DATA COMMUNICATION DEVICES PERMITTING PEER-PEER AND MASTER-SLAVE COMMUNICATIONS

BACKGROUND OF THE INVENTION

1. Field of the Invention

The present invention relates to the field of data-over-voice (DOV) transmission of data in telephone switching systems. More specifically, it relates to the field of protocol synchronization of data packets between distant devices in a distributed switching system, where the distant devices may take on a peer-peer or a master-slave relation.

2. General Background

Telephone switching systems, which connect individual telephones, carry voice information (data) from station to station. They are generally constructed to carry their data in analog form, using the frequency range from 0–3 KHz. Single-building systems often use twisted-pair or similar quality wiring to carry the data, usually with available frequency ranges of up to about 1.8 MHz. This clearly leaves a great deal of unused spectrum space available for other communication activity, such as carrying digital data. When data is carried over a communication link ("commlink") in the higher frequencies above those allocated to voice, the switching system is said to utilize data-over-voice ("DOV").

Telecommunication switching systems can be configured either point-to-point (two end devices directly communicating) or via a central switch. Because each of these forms is desirable under its own optimal set of constraints, it is perferred to have a communication method which operates correctly in either configuration.

An important aspect of communication which many systems encounter is that of synchronizing the frames in which messages are sent. Frames must be synchronized so that messages sent by one device do not collide with those sent by the other device.

A second important aspect of communication is allocation of transmission time on the commlink. Some systems allocate transmission time on the commlink by a method called time compression modulation (TCM) or "pingpong". The ping-pong method is to alternately send packages of bits ("message packets") alternately in opposite directions. The message packet must be collected in memory at one speed and transmitted at a greater speed, generally about twice the collection speed. Upon reception, the packet is decompressed to its normal data rate.

A third important aspect of communication is acknowledgement of messages to assure they have been delivered. In a distributed communication system, it is important to determine if any messages are lost in transmission, so they can be retransmitted if necessary.

3. The Prior Art

A typical method of solving the frame-synchronization problem is to designte one of the two devices as controlling this aspect of communication. This presents a problem when point-to-point communication is desired, because there must be prior agreement as to which device is controlling. Also, multiple types of devices (e.g., "master" and "slave" versions) may be required, at greater expense.

One problem which ping-pong systems are prone to is a general lack of ability to dynamically allocate transmission capacity between communication devices. Often two communication devices have, at differing times, differing requirements for the amount of data which they need to transmit. Failure to allocate transmission time to account for these differing requirements can result in waste, due to a system which operates below capacity.

One method of the prior art is to require that one device be in control of the commlink and that the commlink protocol for allocating transmission capacity must be master-slave in nature. In a multi-device communication system, this is a severe constraint, as no commlink can support two controlling devices. This requires that a single device be placed in control of the entire network. The present invention is able to allocate the commlink between two "peer" devices (neither has absolute control over the commlink) and is able to switch dynamically between peer-peer and master-slave operation in its allocation activity.

One method of solving the lost-message problem is to tag messages with identifiers and to require acknowledgement signals that the messages are received. When messages are lost, however, prior art methods generally require that one of the two devices take control and resynchronize the commlink. Again, in point-to-point communication, this presents a problem.

OBJECTS OF THE INVENTION

Therefore, it is an object of the present invention to provide an improved method for frame synchronization in a data-over-voice system.

It is a second object of the present invention to provide an improved method for allocating access to the commlink between stations in communication.

It is a third object of the present invention to provide an improved method for acknowledgement of messages and resynchronization in a data-over-voice system.

These and other objects of the present invention will become clear after an examination of the drawings, the description and the claims herein.

SUMMARY OF THE INVENTION

In a telecommunication switching system, pairs of devices are connected by means of a single communication link ("commlink"). Time-division access to the commlink is based on a frame window time. Access to the commlink is allocated equally between the pair when full-duplex communication is desired, and unequally when half-duplex communication is desired. Initial communication between device pairs is peer-peer and full-duplex, but either device may, by appropriately flagging any packet it sends, seize the commlink and alter the communication style to master-slave and half-duplex.

The device pair dynamically synchronizes frame windows by each device's sending control signals to modify the other device's handoff delay. This synchronization method may also be used in either a peer-peer or master-slave mode. The method also forces each device to restrict its transmissions to the proper section of the frame window.

Each message is automatically tagged with an acknowledgement tag, which serves both to identify the message and to acknowledge the previous message. Each device periodically sends a synchronization signal to assure that communication is synchronized.

DETAILED DESCRIPTION

Figure 1:
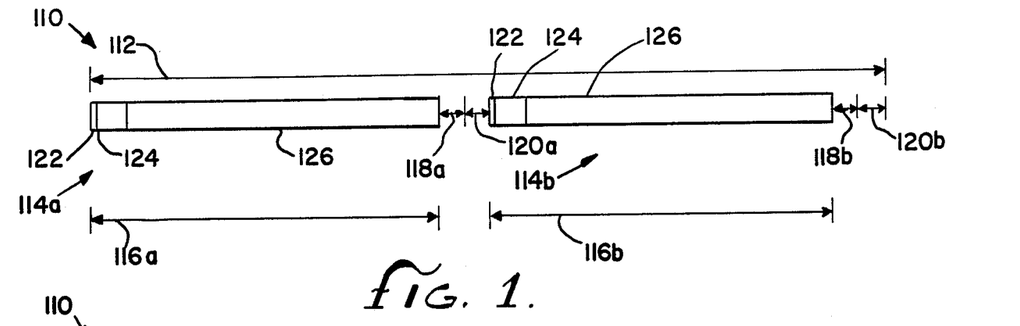
FIGS. 1 and 2 are diagrams showing each device's packet allocation time within the frame window.
Figure 2:
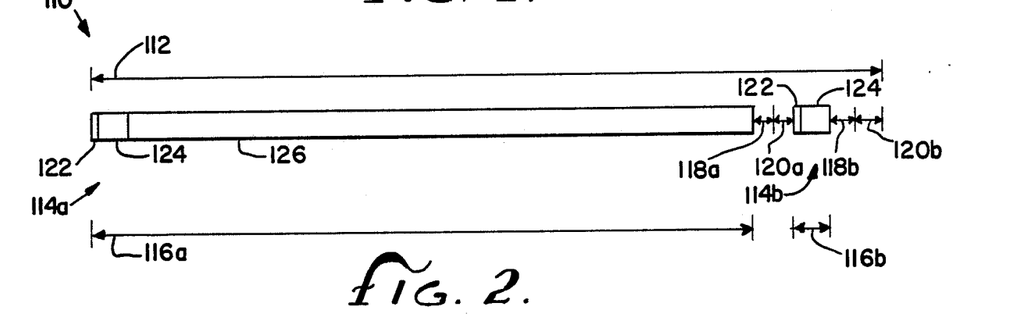

FIGS. 1 and 2 are diagrass showing the packet allocation time each device within the frame window. Transmission time on the communication link (commlink) is divided between the device pair by allocating to each device a specified part of a "frame window" 110. The frame window is a slice of time of fixed, predetermined length which is continually repeated. In a preferred embodiment, bits are transmitted on the commlink at 512 kbps (kilobits per second) and the frame window time 112 is exactly 240 bit-times (468.75 microseconds).

A message to be transmitted on the commlink must be sent from a source device to a destination device in a "message packet" 114a–b, a structured message of a known and predetermined size. Each device is assigned a "packet allocation" time 116a–b, which is the amount of time in which it may send a packet. Each packet is followed by a guard time 118a–b respectively, and then by a handoff-delay time 120a–b respectively. Each device of the pair is allowed one packet per frame window time. The total of the packet allocation time, the guard time, and the handoff-delay time, for both devices, must exactly equal one frame window time 112.

Each packet 114 is divided into a start bit 122, a control section 124, and a data section 126. Two packets 114a–b sent during each frame window 110, one from each device. When the commlink is operating full-duplex, the data sections of each of these packets is 90 bits long, for a total of 180 bits of transmission capacity. However, when the commlink is operating half-duplex, the data sections of the two packets are of unequal length—one is 180 bits long and the other is 0 bits long, for an (unchanged) total of 180 bits of transmission capacity.

In a preferred embodiment of the invention, 180 bits of data transmission capacity is allotted per frame window 110 so that the commlink carries data at a data rate of 192 kbps (full-duplex) and 384 kbps (half-duplex). These rates are preferred because they are integer multiples of 9600 bps, a standard data rate for terminal communications as well as integer multiples of 64 kbps, another standard data rate for communications. Thus, the present invention easily provides for a commlink which can be divided into several data channels, each of a standard data rate.

In a preferred embodiment of the invention, the control section 124 is eight bits long, thus allowing each device to transmit some control information even when it is unable to send any data (because its packet allocation time 116a–b provides for a data section 126 which is 0 bits long). The control section is used to send control information, such as synchronization commands.

Seizing the Commlink

As used herein, "master-slave" refers to a method of operating two devices in which one device is subject to the control of the other. In contrast, in "peer-peer" operation, each device is subject to the control of the other. For allocation of tranmission time on the commlink, the present invention works in either peer-peer or master-slave operation, and has the unique features that (1) while in peer-peer operation either of the devices has the opton of seizing the commlink and changing the communication style to master-slave, and (2) while in master-slave operation the controlling device has the option of relinquishing the commlink and changing the communication style to peer-peer.

The term "full-duplex" refers to a communication style in which both devices are capable of sending data to the other. The term "half-duplex" refers to a communication style in which only one of the two devices is capable of sending data to the other. The present invention works in either full-duplex or half-duplex operation, and has the unique feature that the same commlink may be used for either communication style. Even in half-duplex operation, the present invention provides for certain control signals to be transmitted in the opposite direction from the main flow of data.

Peer-peer communication is maintained by adhering to the packet allocations of FIG. 1. Each device sends one packet per frame window, and each packet has a data section which is 90 bits long. By this method, each device is assigned one half of the data transmission time available on the commlink, and completely full-duplex peer-peer communication is achieved. This is the initial allocation which the device pair starts with for any new commlink.

When master-slave or half-duplex communication is desired, the one device initiates this communication style by "seizing the commlink". A device does this by setting the long-packet bit in the control section of its packet, which indicates that the current packet (not the next packet, this very one) has a data section which is twice normal length, and that the packet allocation for the other device has been cut down to a data section of zero length. This is shown in FIG. 2.

Master-slave communication is maintained by adhering to the packet allocations of FIG. 2. Each device still sends one packet per frame window, but the amount of data which is sent is quite lopsided. By this method, the master device is assigned all of the commlink's data transmission time, and completely half-duplex master-slave communication is achieved. This communication style continues until the controlling device relinquishes the commlink, by clearing the long-packet bit in the control section of any packet, thus indicating that the current packet (not the next packet, this very one) has a data section of normal length, and that the commlink is back to full-duplex peer-peer communication.

Each device's transmission time is controlled, as described below, by the delay introduced by the guard time and the handoff-delay time. Using these offsets from the end of the received packet allows the receiving device to immediately adjust even when the packet allocation for the sending device changes. Each device's reception time is precisely timed by the frame window start. Restricting the start of reception to a narrow window allows easier rejection of line noise and thus better reliability. In a centrally-switched system, the central switch also removes spurious signals not within the packet allocation for each device.

Figure 3:
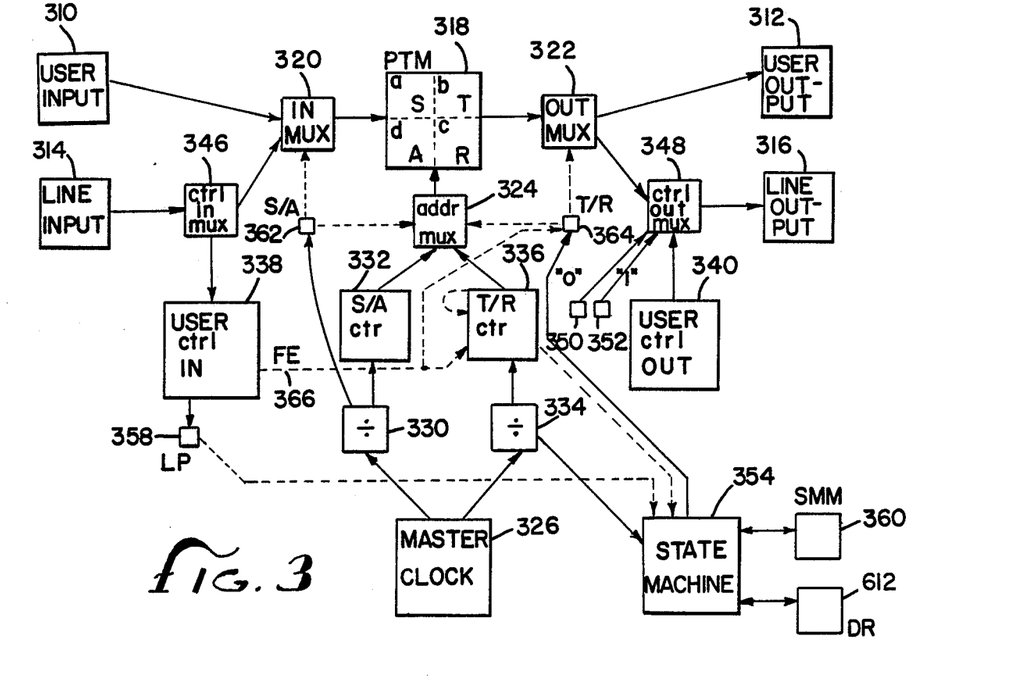
FIG. 3 is a block diagram of the packet reception and transmission circuitry.

FIG. 3 is a block diagram of the packet reception and transmission circuitry. Data bits are input from the user via a user input receiver 310 and output to the user via a user output driver 312. Similarly, data bits are input from the commlink via a line input receiver 314 and output to the commlink via a line output driver 316.

Packet data is transferred between the user and the commlink via a packet transfer memory 318 ("PTM"), which may comprise a random access memory of size 1024×1 bit. The PTM is divided into four data areas 318a–d for sampling 318a, transmission 318b, reception 318c, and analysis 318d of packet data. Input data for the PTM is multiplexed betwee the user input receiver 310 and the line input receiver 314 by an input multiplexer 320. Output data for the PTM is multiplexed between the user output driver 312 and the line output driver 316 by an output multiplexer 322. Address lines for the PTM are selected by an address multiplexer 324.

During full-duplex operation, each data area comprises a 90 bit section of the PTM, while during half-duplex operation (when the device is the controlling device) sampling/transmission will use 180 bit sections and reception/analysis will use 0 bit sections. When the device is the non-controlling device, this is reversed, so that sampling/transmission will use 0 bit sections and reception/analysis will use 180 bit sections.

User control information is input from a user control input 338 and output to a user control output 340. Information which is transmitted as control information (in contrast to user data) is further described below. A control input multiplexer 346 is interposed between the input multiplexer 320 and the line input receiver 314. Similarly, a control output multiplexer 348 is interposed between the output multiplexer 322 and the line output driver 316. The control input and output multiplexers collectively select between the user control channel (comprising the user control input and the user control output) and the user data channel (comprising the input/output connection to the PTM). The control output multiplexer also allows selection of logical constant "0" value 350 or "1" value 352 for the line output driver 316 to place on the commlink.

The packet reception and transmission circuitry in FIG. 3 operates under the control of a master clock 326, which may comprise a crystal clock oscillator or any other reliable computer system clock circuit. In a preferred embodiment of the invention, the master clock oscillates at 9.216 MHz and generates a master clock cycle 328 ("MCC") of about 108.5 nanoseconds. This duration for the MCC is preferred so that the MCC will be an integer multiple of 512 KHz, the commlink transmission frequency, and also of 192 KHz, the commlink full-duplex data transmission capacity.

The master clock 326 is input to a first divide counter 330 to clock the S/A counter 332 at 192 KHz. The S/A counter is used to control the sample and analysis operations, as described below. The master clock 326 is also input to a second divide counter 334 to clock the T/R counter 336 at 512 KHz. The T/R counter is used to control the transmission and reception operations, as described below. The count values from the S/A counter and the T/R counter are input to the address multiplexer 324 for selection of an appropriate address input to the PTM 318.

The four operations—sampling, analysis, transmission, and reception, are performed in parallel using the same control signals and circuitry. Sampling and analysis proceed at the same time, while transmission and reception proceed alternately, as described below. Access to the PTM 318 is carefully controlled by the address multiplexer 324, which selects both which data area 318a–d will be addressed and which offset within the selected data area will be addressed. Selection of a data area is performed by coding for one of the four operations, and swapping data areas when a frame window has been completed. This causes data areas within the PTM to be swapped between the four operations like an ordinary buffer-swap, as is well-known in the art.

In the sampling operation, one bit is read from the user interface and stored in the PTM 318. In the analysis operation, one bit is read from the line interface and stored in the PTM 318. Sampling and analysis proceed in parallel, using the same control signals and circuitry and toggled by an S/A bit 362, as described below.

The S/A bit 362 is toggled by the first divide counter 330 so that sampling and analysis operations are alternately performed. It is input to the address multiplexer 324 to aid selection of an appropriate address input to the PTM 318. During full-duplex operation, one of the sampling/analysis operations will be a null operation because zero time will be allocated to that operation. The first divide counter will operate at twice normal speed, so that data bits are sampled/analysed at twice normal speed, but the null operation will have no effect.

The signal from the second divide counter 334 is input to a state machine 354 and clocks the state machine from state to state, as is well-known in the art. The state transition diagram 410 for the state machine is further disclosed with reference to FIG. 4. State information for the state machine comprises a TR bit 356 and an LP bit 358. The state machine operates under control of a state machine memory 360 ("SMM"), and directs the operation of the packet reception and transmission circuitry, based on the state information for the state machine and the contents of the T/R counter 336, as described below.

In the transmission operation, one bit is read from the transmission source (either a data bit, a supervision bit, or a framing bit, as selected by control output multiplexer 348) and forwarded to the line output. In the reception operation, one bit is read from the line input and forwarded to the reception sink (either a data bit or a supervision bit, as selected by multiplexers 322, 348). The transmission and reception operations are controlled by the state machine.

The SMM 360 contains control instructions for select operations by the various multiplexers—the output multiplexer 322, address multiplexer 324, and control output multiplexer 348. Each memory entry of the SMM is addressed by use of the LP bit 358, the T/R bit 364, and the contents of the T/R counter 336. Each memory entry of the SMM contains a set of control bits which indicate whether line input or output is to be performed, whether user data or control information is to be input/output, and whether special fixed values (such as the start bit or the fixed logical "1" bit) are to be output. The contents of the SMM simply direct selection of data paths by multiplexers 346, 320, 324, 322, 348. The contents are completely dependent on the operations of the transmission/reception processes, and would be clear to one of ordinary skill in the art. An example is shown in an appendix.

The transmission process starts by sending a start bit. It then sends eight control bits, and finally sends data bits, which may be either 0, 90, or 180 bits. The control of how many data bits to send is based on the LP bit 358, which is latched and input as part of the state machine's SMM 360 address. After sending the packet, the transmission process sends nothing for the guard time of 10 bits, and then sends nothing for the handoff-delay time, which is 10 minus the value in a delay-register. The transmission process resets after 134 idle bits, after which it assumes that the other device has nothing to transmit and starts again anyway. Note that 120 idle bits would just about be equal to half of one frame window, so that if the other device has data to send, the transmit process would be reset by the other device's start bit.

In parallel to the transmission process, the reception process is reset by an FE signal 366 (the first edge of the incoming start bit). It reads eight control bits and finally reads data bits, which may be either 0, 90, or 180 bits. Again, the control of how many data bits to read is based on the LP bit, which is latched and input as part of the address presented to SMM 360 by the state machine. After reading the packet, the reception process reads nothing for the guard time of 10 bits, and then reads nothing for the handoff-delay time, which is the value in the delay-register. The receiver process then restarts the transmission process.

Particular control information includes the start bit and the eight control bits. The eight control bits comprise a fixed logical "1" bit, the LP bit 358, a reserved bit, a "supersync" bit, and four supervision bits. The purpose of these bits in synchronization is further described below.

The start bit is output by forcing a logical "0" out to the line output driver 316. When input, the first edge of the start bit causes a signal FE 366 to be generated, which resets the T/R counter 336 and causes the packet circuitry to enter the reception operation. The state machine 354 recognizes the reset when it next accesses the SMM 360. The FE 366 signal also causes the T/R bit 363 to be set to reception.

Figure 5:
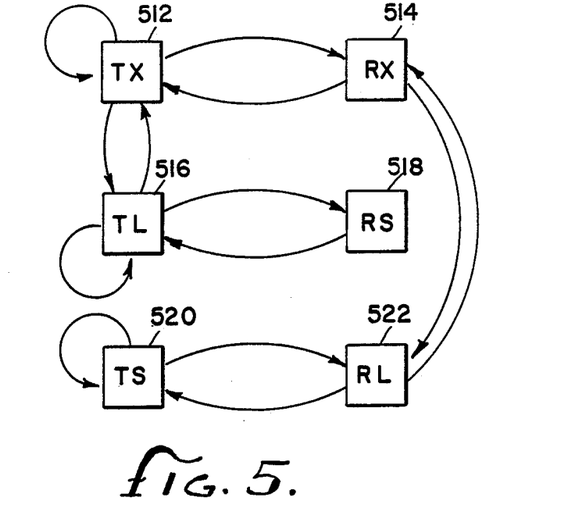
FIG. 5 is a state transition diagram for the T/R state machine.

The LP bit 358 is output by selecting the user control output 340 when the time for the LP bit occurs. When input, the LP bit is immediately latched. The state machine 354 recognizes the immediate occurance of a long-packet (and its own transition to the RL state 522) because the LP bit is directly input to the SMM 360 as an address bit. Hence, that section of the SMM corresponding to the RL state 522 is immediately accessed during the long packet which was signalled.

The four supervision bits are grouped into three banks. The first bank is used to synchronize the timing of the transmit and receive ends of the commlink, as is further disclosed with reference to FIG. 6. Two bits are assigned to be "up" and "down" codes, while the other two bits are used to signal the remote device to enter "test" or "answerback" mode. The "test" and "answerback" modes are well-known in the art of telecommunication. The second bank is used to directly transmit RS-232 codes to the user device. RS-232 codes are a well-known standard in the art. The third bank is used to directly transmit four codes to the user device which the user device may use for its own application, and are not further defined.

Figure 4:
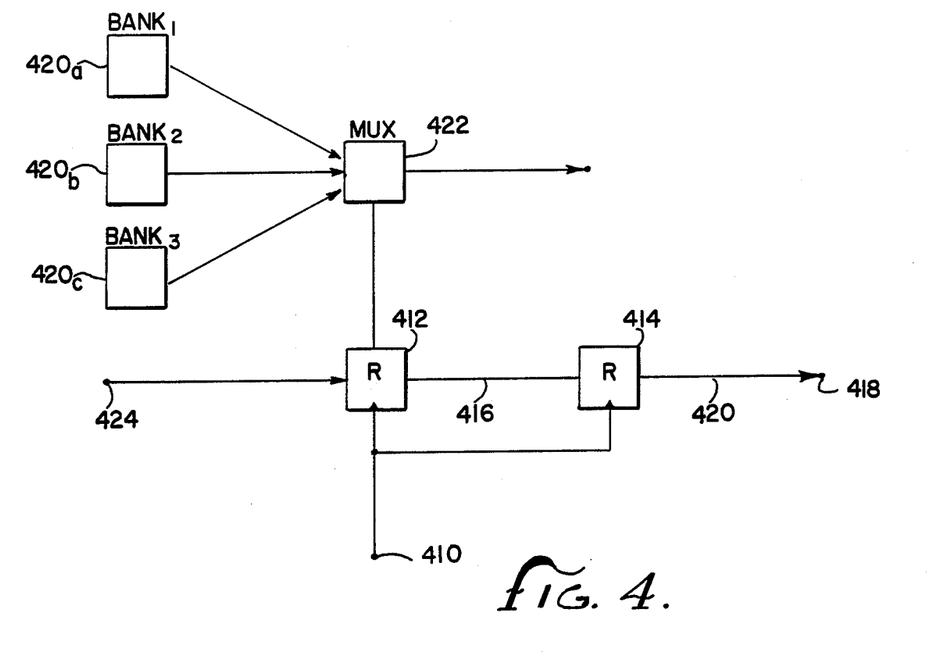
FIG. 4 is a block diagram of the circuitry which uses and generates the "supersync" bit.

FIG. 4 is a block diagram of the circuitry which uses and generates the "supersync" bit. The supersync bit is used to assure that multiplexing of the three banks of supervision bits is synchronized. The supersync bit 410 is input from the user control input 338 and used to reset a supervision counter 412 and a supersync counter 414.

These two counters are both divide-by-3 counters, arranged so that the supervision counter is clocked by an end-of-transmission signal on line 424, the supersync counter is clocked by the overflow 416 of the supervision counter on line 416, and the output supersync bit at node 418 is generated by the overflow of the supersync counter on line 420. The supervision counter selects between one of the three possible banks 420a–c of supervision bits, using a multiplexer 422.

The supersync bit is sent once per nine message packets and the supervision (control) bits cycle 0, 1, 2 in a three-message cycle. Each device responds to a packet labelled 0 with a packet labelled 2, to a packet labelled 1 with a packet labelled 0, and to a packet labelled 2 with a packet 1. The supersync bit, when received, forces a device to act as if it had just received a packet labelled 0.

FIG. 5 is a state transition diagram for the T/R state machine. Six states (TX 512, RX 514, TL 516, RS 518, TS 520, and RL 522) are recognized.

When in state TX 512, a transition to state RX 514 occurs when the FE 366 signal is received. A transition to state TL 516 occurs when the LP bit 358 is output to the commlink as a "1". A transition back to state TX occurs when the T/R counter overflows.

When in state RX 514, a transition to state TX 512 occurs when the handoff-delay time expires. A transition to state RL 522 occurs when the LP bit 358 is received as a "1".

When in state TL 516, a transition to state RS 518 occurs when the FE 366 signal is received. A transition to state TX 512 occurs when the LP bit 358 is output to the commlink as a "0". A transition back to state TL occurs when the T/R counter overflows.

When in state RS 518, a transition to state TL 516 occurs when the handoff-delay time expires.

When in state TS 520, a transition to state RL 522 occurs when the FE 366 signal is received. A transition back to state TX occurs when the T/R counter overflows.

When in state RL 522, a transition to state TS 520 occurs when the handoff-delay time expires. A transition to state RX 514 occurs when the LP bit 358 is received as a "0".

Synchronization

Figures 6, 7:
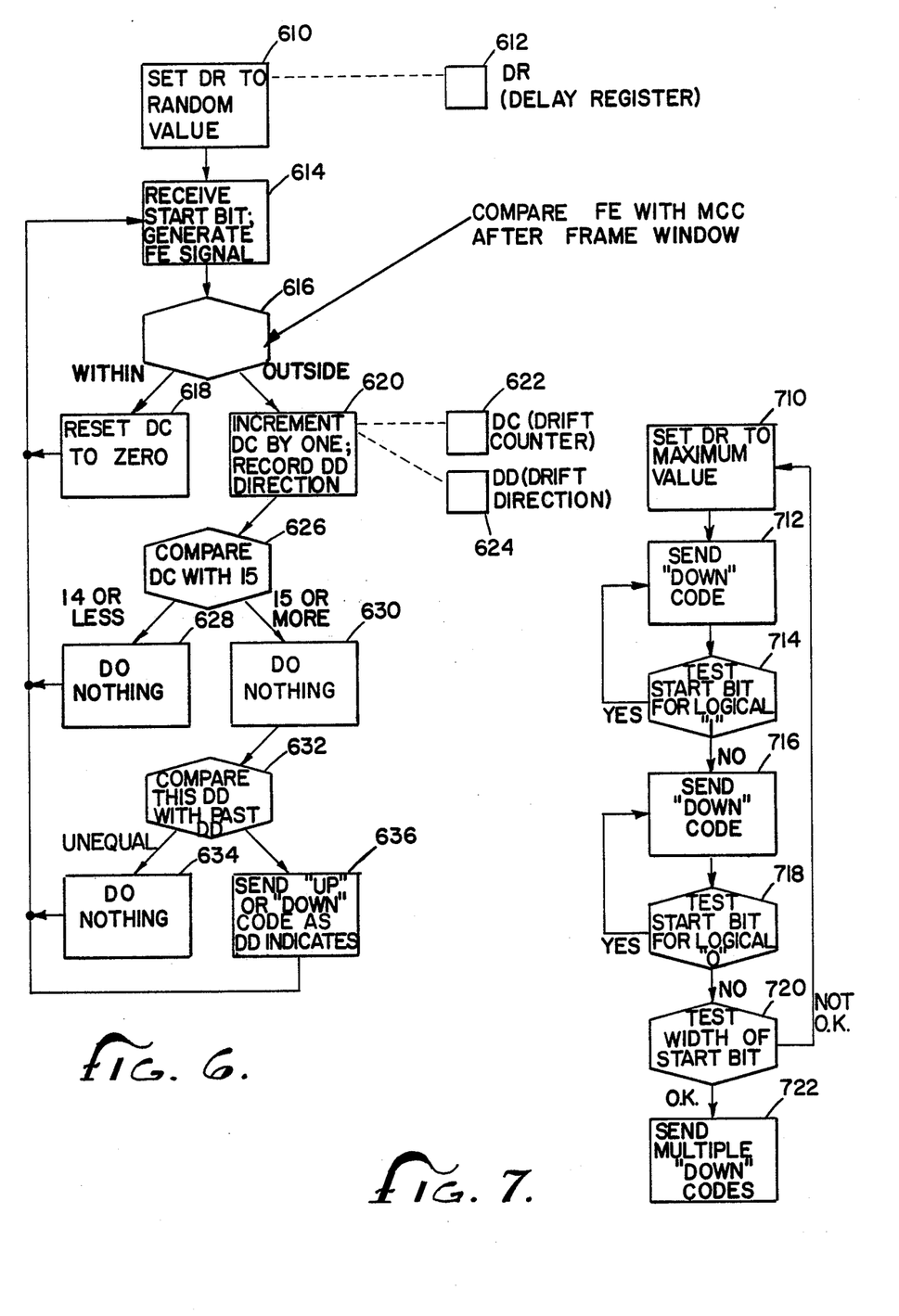
FIGS. 6 and 7 are flowcharts showing the operation of the frame synchronization method.

FIGS. 6 and 7 are a flow chart of the synchronization method. Like the method for allocating the commlink, the synchronization method can operate in either a peer-peer or master-slave mode. In peer-peer mode both devices freely issue synchronization commands to the other; while in master-slave mode, the controlling device issues synchronization commands and ignores responsive commands from the other. The same method of operation is used for both modes, but in master-slave mode the controlling device simply disables its response to the other's synchronization commands.

FIG. 6 shows peer-peer operation. Synchronization is accomplished by altering the delay register which is each device uses to determine its handoff-delay time. In peer-peer mode, the operation of each device is the same, so the term "each device" is used, although the two devices may not execute these steps simultaneously. At step 610, each device starts with a completely unknown and unpredetermined value in its delay register 612, caused by device startup.

At step 614, each device receives the start bit and generates the signal "FE". At step 616, each device compares the timing of the signal FE with the MCC immediately following the previous frame window. Each device continues with step 618 if FE falls within this MCC, or with step 620 if FE falls outside this MCC.

At step 618, (if FE falls within this MCC) a drift counter 622 is reset, and the device continues with step 614. At step 620, (if FE falls outside this MCC) the drift counter is incremented and a drift direction register 624 is set. The device then continues with step 626.

At step 626, each device compares the drift counter with 15. Each device continues with step 628 if the drift counter is 14 or less, and with step 630 if the drift counter is 15 or more.

At step 628, (if the drift counter is 14 or less) no action is performed, and the device continues with step 614. At step 630, (if the drift counter is 15 or more) no action is performed, and the device continues with step 632.

At step 632, each device compares the present value of its drift direction register 624 with its previous value. Each device continues with step 634 if the values are unequal, and with step 636 if the values are equal.

At step 634 (unequal direction of drift), no action is performed and the device continues with step 614. At step 636 (equal direction of drift), if the direction of drift was upward, a "down" signal is generated to decrement the delay register 612 for the other device, while if the direction of drift was downward, an "up" signal is generated to increment the delay register for the other device.

FIG. 7 shows master-slave operation. A controlling device, while the other devices executes the steps in FIG. 7 and ignores synchronization commands from the other device, while the other device continues to execute the steps in FIG. 6.

At step 710, the controlling device sets the delay register 612 for the maximum value. A specialcode, comprising send both the "up" and "down" codes simultaneously, is used to effect this action. At step 712, a "down" code is sent to the other device. At step 714, the start bit of the return message is compared with a logical "1", returning to step 712 so long as a logical "1" is detected and continuing with step 716 when a logical "0" is detected. At this point, the beginning of the start bit has been located.

At step 716, a "down" code is sent to the other device. At step 718, the start bit of the return message is compared with a logical "0", returning to step 716 so long as a logical "0" is detected and continuing with step 720 when a logical "1" is detected. At this point, the middle of the start bit has been located.

At step 720, the width of the detected start bit is determined by noting the time difference between the beginning and the middle of the start bit. If the width is too small, the start bit is rejected as possible noise and the controlling device starts over at step 710. Otherwise, it continues with step 722.

At step 722, a predetermined number of "down" codes, totalling ¼ of a bit duration, are sent to align the start bit with the ideal sampling time, ¾ of the time duration into the bit.

While a presently preferred embodiment has been disclosed, many variations are possible which remain within the scope of the present invention.

APPENDIX

FIG. 2-8. ROM Control

| | TRANSMISSION | | RECEPTION | |
|---|---|---|---|---|
| Address | Code | Description | Code | Description |
| 00 | 37 | Start bit | 16 | (ignore start bit) |
| 01 | 15 | Long packet bit | 16 | (shift in |
| 02 | 13 | Super sync | 12 | frame control |
| 03 | 13 | Logic 1 | 12 | bits in the |
| 04 | 11 | Reserve bit | 12 | I/O section) |
| 05 | 13 | Supervision 0 | 10 | (receive supervision |
| 06 | 13 | Supervision 1 | 12 | bits in the |
| 07 | 13 | Supervision 2 | 12 | I/O section |
| 08 | 17 | Supervision 3 | 12 | as above) |
| 09 | 17 | Data bit 0 | 16 | Data bit 0 |
| : | 17 | : | 16 | : |
| : | 17 | (90 data bits) | 16 | (90 data bits) |
| : | 17 | : | 16 | : |
| 62 | 17 | Data bit 88 | 16 | Data bit 88 |
| 63 | 16 | Data bit 89 | 16 | Data bit 89 |
| 64 | 16 | Guard bit 0 | 16 | Guard bit 0 |
| : | 16 | (12 guard bits) | 16 | (10 guard bits) |
| 6D | 16 | Guard bit 9 | 16 | Guard bit 9 |
| 6E | 16 | Guard bit 10 | 1E | RX to TX DELAY ENABLE |
| 6F | 06 | Guard bit 11 | 1E | : |
| 70 | 06 | TX to RX WINDOW | 1E | (9 bits) |
| : | 06 | : | 1E | : |
| 76 | 06 | (10 bits) | 1E | RX to TX DELAY ENABLE |
| 77 | 06 | : | 16 | Null bits |
| 78 | 06 | : | 16 | : |
| 79 | 16 | TX to RX WINDOW | 16 | : |
| 80 | 16 | Null bits | 16 | : |
| : | 16 | : | 16 | : |
| FF | FF | Null bits | 16 | Null bits |

Notes:
The address and code is in hexadecimal notation:
The meaning of the individual bits in the ROM word is as follows:
Bit 7 = Not used.
Bit 6 = Not used.
Bit 5 = Start bit time during transmission.
Bit 4 = TX to RX Window (load = 0, start count = 1).
Bit 3 = RX to TX Delay Enable
Bit 2 = Supervision time for both TX and RX.
Bit 1 = Load supervision bits for transmission.
Bit 0 = Transmission enable (true during actual transmission) next bit

We claim:
1. A device for synchronizing communication between a pair of data communication devices, comprising in each said data communication
   detection means for detecting a reception arrival time from the other data communication device;
   comparator means for comparing said reception arrival time with a predetermined frame window;
   signalling means for generating an adjustment signal in either said data communication device when said reception arrival time fails to fall within a predetermined range of said predetermined frame window; and
   delay register means, responsive to said adjustment signal from the other said data communication device, for adjusting a transmission start time.
2. A device as in claim 1, wherein said comparator means operates with respect to each message received by each said data communication device.
3. A device as in claim 1, comprising
   drift detector means for detecting a rate of clock drift between said pair of data communication devices;
   drift comparator means for comparing said rate of clock drift with a predetermined rate.
4. A device as in claim 1, comprising
   means for disabling said delay register means in one said data communication device.

5. In a telecommunications switching system, a method of synchronization between a first data communication device and a second data communication device, comprising each said data communication device performing the steps of
  detecting a reception arrival time from the other said data communication device;
  comparing said reception arrival time with a predetermined frame window start time;
  generating an adjustment signal when said reception arrival time fails to fall within a predetermined range of said predetermined frame window start times; and
  responding to said adjustment signal from the other said data communication device by adjusting said time of transmission start to fall within said predetermined range of predetermined frame window start times.

6. A method as in claim 5, wherein said step of comparing is performed for each message received by each said data communication device.

7. A method as in claim 5, comprising the steps of
  detecting a rate of clock drift between said first and second data communication devices;
  comparing said rate of clock drift with a predetermined rate.

8. A method as in claim 5, comprising the step of disabling said step of responding in one said data communication device.

9. A device for synchronizing communication between a pair of data communication devices, said data communication devices communicating in a time-division multiplexed manner in a periodic frame window, comprising in each said data communication device
  means for detecting a phase delay between start of said periodic frame window and start of a message received from said other data communication device;
  means for comparing said phase delay with a predetermined value;
  means for generating an adjustment signal in said other data communication device when said phase delay exceeds said predetermined value; and
  means, responsive to said adjustment signal from said other data communication device, for adjusting a phase delay between start of said periodic frame window and start of a message transmitted to said other data communication device.

10. In a telecommunications switching system, a method of synchronization between a pair of data communication devices, said data communication devices communicating in a time-division multiplexed manner in a periodic frame window, comprising each said data communication device performing the steps of
  detecting a phase delay between start of said periodic frame window and start of a message received from said other data communication device;
  comparing said phase delay with a predetermined value;
  generating an adjustment signal in said other data communication device when said phase delay exceeds said predetermined value; and
  responding to said adjustment signal from said other said data communication device by adjusting a phase delay between start of said periodic frame window and start of a message transmitted to said other data communication device.

* * * * *

UNITED STATES PATENT AND TRADEMARK OFFICE
CERTIFICATE OF CORRECTION

PATENT NO. : 4,796,255
DATED : January 3, 1989
INVENTOR(S) : James E. WESTBROOK, Adolfo B. SUAREZ It is certified that error appears in the above-identified patent and that said Letters Patent is hereby corrected as shown below:

On the face of the patent, in the "Inventors" section, change "Juarez" to --Suarez--.

In claim 1, col. 10, line 45, add --device-- after "communication".

Signed and Sealed this

Twenty-sixth Day of September, 1989

Attest:

DONALD J. QUIGG

Attesting Officer

Commissioner of Patents and Trademarks